US012621608B2

(12) United States Patent
Porciatti et al.

(10) Patent No.: US 12,621,608 B2
(45) Date of Patent: May 5, 2026

(54) RIGID LINEAR DIAPHRAGM LOUDSPEAKER AND MOUNTING SYSTEM

(71) Applicant: JLC-Tech IP, LLC, St. Petersburg, FL (US)

(72) Inventors: Silvio Porciatti, Pembroke, MA (US); Lewis Athanas, Marblehead, MA (US)

(73) Assignee: JLC-Tech IP, LLC, St. Petersburg, FL (US)

( * ) Notice: Subject to any disclaimer, the term of this patent is extended or adjusted under 35 U.S.C. 154(b) by 324 days.

(21) Appl. No.: 18/211,016

(22) Filed: Jun. 16, 2023

(65) Prior Publication Data

US 2023/0412985 A1 Dec. 21, 2023

Related U.S. Application Data

(60) Provisional application No. 63/353,107, filed on Jun. 17, 2022.

(51) Int. Cl.
*H04R 9/04* (2006.01)
*H04R 7/04* (2006.01)
*H04R 9/06* (2006.01)

(52) U.S. Cl.
CPC ................. *H04R 7/04* (2013.01); *H04R 9/06* (2013.01)

(58) Field of Classification Search
CPC ................................ H04R 9/047; H04R 9/048
See application file for complete search history.

(56) References Cited

U.S. PATENT DOCUMENTS

| | | | | |
|---|---|---|---|---|
| 4,856,071 | A * | 8/1989 | Marquiss | H04R 1/2857 381/186 |
| 8,335,339 | B2 * | 12/2012 | Tagami | H04R 9/046 381/413 |
| 9,674,615 | B2 * | 6/2017 | Fan | H04R 9/047 |
| 11,134,333 | B2 * | 9/2021 | Cho | H04R 9/045 |
| 2007/0140520 | A1 | 6/2007 | Konuma | |
| 2008/0137901 | A1 | 6/2008 | Michno | |
| 2008/0137902 | A1 | 6/2008 | Bohlender | |

FOREIGN PATENT DOCUMENTS

| | | | | |
|---|---|---|---|---|
| KR | 20150051359 | A * | 5/2015 | H04R 9/06 |

* cited by examiner

*Primary Examiner* — Ryan Robinson
(74) *Attorney, Agent, or Firm* — Heisler & Associates

(57) ABSTRACT

A frame has an elongate form with elongate rest shelves on lateral sides thereof to support ceiling tiles. Ends of the frame are connected to T-bars within a suspended ceiling, as one example of mounting system for the loudspeaker of this invention. A yoke is fixed within a channel of the frame. The yoke has a pair of arms supporting magnets on ends thereof. A gap is provided between the magnets. A voice strip is located within this gap between the magnets and has a piston thereon which includes a diaphragm. A voice coil associated with the voice strip interacts with a magnetic field created by the magnets to cause the piston to vibrate, and in turn to cause the diagram to emit sound waves. The diaphragm is elongate with a width less than 10% of its length. A surround supports a perimeter of the diaphragm relative to the frame.

13 Claims, 8 Drawing Sheets

RIGID LINEAR DIAPHRAGM LOUDSPEAKER AND MOUNTING SYSTEM

CROSS-REFERENCE TO RELATED APPLICATIONS

This application claims benefit under Title 35, United States Code § 119(e) of United States Provisional Application No. 63/353,107 filed on Jun. 17, 2022.

FIELD OF THE INVENTION

The following invention relates to loudspeakers having a long and thin geometry. More particularly, this invention relates to loudspeakers having a long and thin geometry and which also have high quality frequency response for a variety of frequencies, including long wavelength bass frequencies, and which are configured to also support ceiling tiles adjacent to the loudspeaker and integrating the loudspeaker within a suspended ceiling.

BACKGROUND OF THE INVENTION

Most loudspeakers are of a type called dynamic loudspeakers. They utilize a coil of wire placed within a magnetic field. By varying current through the wire (or adjusting the magnetic field) the coil of wire is caused to move perpendicular to the magnetic field. A diaphragm is fixed to the coil of wire (also called the voice coil). A sound signal is encoded into an electric signal sent along the wire, generally in the form of an analog alternating current passing along the wire. Forces vary based on the instantaneous current passing through the coil of wire at the voice coil. Interaction between this current and magnetic field causes these varying forces to be applied to the voice coil, moving the voice coil perpendicular to the magnetic field, and causing the diaphragm to also move. The diaphragm (also called the cone) interacts with air molecules to cause them to move in a manner (and frequencies) which creates sound waves in the air which can then be heard by individuals (or detected by other sensors) nearby. The diaphragm is made stiff enough so that it can rapidly move. The diaphragm is made large enough to move a sufficient volume of air to produce a desired sound intensity.

Sound waves having different frequencies are encountered by the individual as different "pitch" sounds. Diaphragms of differing sizes tend to optimize sound output for a subset of all frequencies which can be heard by an individual. Thus, some loudspeakers have multiple speaker elements therein with different sized diaphragms optimized for different frequencies. Generally, lower frequencies benefit from having larger diaphragms.

Loudspeakers are often provided in indoor spaces. Where premium sound quality is a priority, speakers of optimal shape and size are provided within cabinets which rest on the floor or stand on pedestals or are mounted to walls (or suspended from ceilings) of the indoor space. Such sizing and mounting of loudspeakers typically takes up floor and wall space, and so is typically only done in rooms where sound quality is a high priority.

In many indoor spaces quality sound is desirable, but not the highest priority. Rather, other priorities such as preserving floor space for furniture, corridors, flexible open floor space, and a variety of other equipment and items take precedence over large speakers standing on the floor or mounted to and extending out from the walls. In such indoor spaces, it is desirable to mount loudspeakers to the ceiling. Such a positioning of loudspeakers has the benefit of keeping floor space and wall space free for other equipment, while still providing sound for the space. In such situations, high quality sound is often still a priority, as well as sound intensity. Other priorities also become important for such speakers including ease of installation, aesthetic appearance, and integration into existing ceiling elements.

In one instance, desirable aesthetic appearance for the ceiling mounted speakers could include minimizing or completely concealing the speakers within the ceiling. Many ceilings for indoor spaces are provided in the form of "suspended ceilings" (also called "dropped ceilings"), which include a grid of T-bars suspended from overlying structure, and with generally planar acoustic ceiling tiles supported at their edges by the T-bars. In the prior art, speakers have been primarily mounted within such dropped ceilings by replacing a ceiling tile with a speaker grill and mounting a loudspeaker facing downwardly above the speaker grill and within space between the dropped ceiling and overlying structure. Such speaker grills typically have a size similar to a ceiling tile and are configured so that at least the grill thereof can be supported by the T-bars. Typically holes pass through the grill at the location of the diaphragm of the speaker, so that sound waves can efficiently pass through the grill.

The grill can either have a similar color and other appearance characteristics to those of adjacent ceiling tiles for maximizing concealment type aesthetic attributes, or can be contrasting in appearance in a manner which still provides a desirable overall design appearance for the ceiling. Such ceiling mounted speakers integrate effectively into existing dropped ceilings, in that the same T-bar grid is utilized and so does not require modification, and ceiling tiles do not require modification or customization, but rather only replacement of one ceiling tile with the speaker grill and speaker assembly.

In one embodiment depicted in U.S. Pat. Nos. 9,883,267 and 10,313,771 (and incorporated herein by reference in their entirety), it is known to provide loudspeakers supported within a dropped ceiling, not by replacing an acoustic tile, but rather by integrating the loudspeaker into a T-bar within the T-bar grid of the suspended ceiling system. An example from the prior art is included herein within FIGS. 1-7. With such a configuration, the substitution of a ceiling tile with a speaker grill is no longer required. This minimizes disruption to the aesthetic appearance of the ceiling which is created by the ceiling tiles themselves. Often speakers and other equipment, when requiring substitution of ceiling tiles, break up what would otherwise be a desirable continuous repeating pattern of ceiling tiles within the T-bar grid. Designers are thus freed to design ceilings with fewer design constraints.

Such prior art speaker systems mounted within T-bars contemplate a series of small conical diaphragms behind a grill of elongated form similar in shape to a lower surface/rest shelf of the T-bar. While as few as a single conical speaker could be utilized, typically an array of speakers would be provided, such as one speaker every six inches (as an example). A greater or lesser number of conical speakers could be provided. The diameter of these conical speakers would be restricted to being less than the width of the lower surface of the rest shelf of the T-bar (typically about one inch). While generally effective, this has the undesirable consequence of not being able to more effectively match longer wavelength low frequency pitch sound.

Accordingly, a need exists for loudspeakers which can be mounted within T-bars of a suspended ceiling system, so that the benefits of mounting of loudspeakers from a ceiling and incorporating them into a suspended ceiling without replacement or modification of ceiling tiles, can be maintained, but which also can have better sound quality then that way she can be provided by small conical speakers. Such a system would have better low frequency performance. Also, problems associated with sound waves from separate speakers interacting with each other and creating patterns of "dead spots" within the interior space or other distortion, are also preferably minimized or eliminated.

SUMMARY OF THE INVENTION

With this invention, an elongate loudspeaker is provided with a elongated linear diaphragm so that high quality sound can still be produced without the geometric restrictions associated with conical diaphragms. One application for such an elongate loudspeaker is mounted to or incorporated into a lower surface of a rest shelf of a T-bar within a suspended ceiling above an indoor space.

A narrow long loudspeaker is constructed such that it has its diaphragm replaced with a piston of elongate rectangular form. The piston has a width similar to a width of a T-bar, for applications where the loudspeaker is to be integrated into a T-bar of a suspended ceiling. This piston width is comparable to the highest wavelength of interest for human hearing, around one inch for full range audio (20 kHz), and with the piston having a length theoretically as long as desired, with 1 to 4 feet being a useful typical size. The piston could be planar or conceivably curved somewhat, such as with a semi-cylindrical concave-down form.

When the piston is driven, a cylindrical wave front is created, which would have a central axis of such a cylinder shape oriented horizontally, and with the waves emanating radially downwardly from the piston, upon individuals beneath the piston of the loudspeaker. Such speakers could as an option be mounted to walls, with a length extending either horizontally or vertically (or diagonally) and similarly be useful in some embodiments. Such a configuration focuses the sound on the listener without any hotspots or beaming, but rather with a homogenous sound experienced by individuals on the floor beneath the ceiling. The narrow width speaker includes a frame (which can support rest shelves for supporting adjacent ceiling tiles in one embodiment). The frame also supports a magnet assembly (typically upon a yoke thereof) which magnets and other elements of the speaker are thin enough to fit into small spaces where high performance loudspeakers have not been previously possible, such as ceiling placement between acoustic tiles. Both aesthetics and acoustic performance are thus optimized.

The following is the mathematical term for dynamic speaker efficiency, once various constants are removed, for simplicity:

$$(BL)^2 \times Sd^2$$

$$Re \times Mms^2$$

Where:

B=strength of the magnetic field in the gap

L=length of conductor within the magnetic field

Sd=surface radiating area of the speaker diaphragm

Re=total resistance of the electrical conductor

Mms=total moving mass of the diaphragm and the spine and conductor

A single RLDL speaker has a similar Sd as a standard 6½" conical speaker. Typical differences are as follows:

| | RLDL | 6½" |
|---|---|---|
| Re | <1 Ω | 4 Ω |
| Mms | 8 grams | 17 grams |

Which when inserted in the equation gives the Rigid Linear Diaphragm Loudspeaker ("RLDL") a 12 dB advantage which can be utilized as sound volume or bass extension, if multiple units are used.

What is not in the equation is high frequency response. A typical 6.5" speaker cannot reproduce these frequencies well, because of the moving mass and the size and material of the round diaphragm. No point of the RLDL diaphragm as described is more than 0.4" from the driving element, closer than many tweeters, which gives quick, better coupled and accurate response to high frequencies; in the case of the 6½" speaker, the outer edge of the diaphragm is typically greater than 2", and is not directly controlled by the voice coil. Also the shear size of the cone will beam higher frequencies directly forward, and not add to most of the sound output of the speaker. Hence it is typical to cross over the 6½" speaker to a smaller unit for the high frequencies in the range of 3-5 kHz. No such additional unit or crossover network is needed with the RLDL.

To build an equivalent line source to a 1"×22" RLDL using round micro-speakers, would require roughly sixteen 20 mm speakers. Although the total surround length would be similar to the RLDL, due to the circular shape and construction abilities, the individual speakers would be much less compliant, limiting low frequency response; and although the individual units can exhibit good high frequency performance, due to the spacing the output would be irregular due to interference between the speakers. The system would exhibit "picket fencing," or alternating spots of high frequencies.

The RLDL offers significant performance abilities and elegant engineering solutions in many applications where the listener(s) are within the near field, which is determined by the length of the line source, but most interior spaces such as homes, listening rooms, conference rooms and open office areas would be applicable to these designs.

One example embodiment is depicted in included figures and configures the loudspeaker as a substitute for a section of T-bar within a T-bar grid of a suspended ceiling. The piston which replaces the function of the diaphragm/cone of conical loudspeakers is mounted to a lower portion of a voice strip. This voice strip is a rigid vertical (typically planar) structure which in one embodiment is formed of electrically conductive material such as aluminum. Cross-sectional shape of the voice strip can be optimized for rigidity, such as giving the cross-sectional shape of the voice coil an "I-beam" type cross-section with horizontal flanges at at least an upper edge thereof (and with either the piston acting as a lower flange for this "I-beam" configuration or a lower aluminum flange provided to which the very rigid piston is mounted.

As an alternative, the voice coil could be formed of other materials, including non-conductive materials, and preferably be sufficiently rigid and lightweight so that it can move rapidly up-and-down without flexing or other distortion (up-and-down being the orientation involved when the rigid linear diaphragm loudspeaker is mounted to a horizontal ceiling and sound is emanating primarily downwardly from the loudspeaker). If the materials are non-conductive, such as carbon fiber or the same or similar material as the piston is formed of, such as Rohacell foam, this can influence a conductive pathway provided with the voice strip.

In particular, what would otherwise be the coil of wire on the voice coil of a conical loudspeaker is replaced with a linear conductive pathway extending along a length of the voice strip, which length is typically similar to the length of the speaker and a length of the piston. If the voice strip is formed of electrically conductive material, such as aluminum, the voice strip itself could provide the conductive pathway. As an option, the conductive pathway could be provided in the form of a wire extending along a length of the voice strip, which electrically conductive wire would be necessary if the voice strip is formed of non-electrically conductive material. As one option, such a wire could have multiple turns extending along a length of the voice strip, so that an exceptionally elongate "coil" is still provided by the wire for the conductive pathway, with each turn of the coil being about one inch by twenty-four inches for a two foot long speaker fitting a two foot long T-bar. Coils of other sizes or orientations could alternatively be provided.

The electrically conductive pathway is coupled to a sound signal source, which would typically be some form of audio amplifier coupled to a sound file player (or to a microphone or other inputs if the speaker is associated with a public address system or other live music or live sound system). Typically, this sound signal source would be the same as those already existing in the prior art. Sound mixing boards might have sound mixing levels adjusted by a skilled professional so that resulting sound emanating from the rigid linear diaphragm loudspeaker has optimal sound characteristics for human listeners.

As an option, the sound signal source could be modified in some manner before reaching the voice strip to optimize this sound signal source for driving the rigid linear diaphragm loudspeaker. For instance, if frequencies matching a length (or width) of the piston tend to have a higher intensity than other frequencies emanating from the rigid linear diaphragm loudspeaker, a filter could be provided which filters out at least some excessively intense frequencies of the incoming sound signal, such that the sound emanating from the RLDL more closely matches intensities of different frequencies of sound emanating through the air to listeners.

The voice strip is located within a gap between rows of magnets. These rows of magnets include two parallel rows on lateral sides of the voice strip and running along a length of the elongate loudspeaker. In this particular embodiment, and as depicted in detail in a cross-section shown in the figures, a housing is provided which has a generally inverted U-shape with a central channel and laterally spaced legs extending downwardly therefrom. In one particular embodiment, four such legs extend downwardly including outer laterally spaced legs and inner laterally spaced legs. The outer laterally spaced legs support rest shelves extending laterally away from each other and which can support edges of ceiling tiles thereon. A lowermost grill of the loudspeaker can also be supported by these outer laterally spaced legs, which grill keeps dust off and protects contact from occurring with the more sensitive piston and other loudspeaker components, and also can provide a desirable aesthetic appearance for the linear loudspeaker.

Inner laterally spaced legs can support a surround which mounts to lateral edges of the piston. While the piston is highly rigid, the surround is configured to be highly flexible and compliant, so that it freely allows the piston to vibrate, but keeps the piston centered, and especially the voice strip centered between the magnets. The surround also tends to restrain the piston so that it can only move in an up-and-down manner responsive to driving forces associated with interaction of current in the conductive pathway and the magnetic field produced by the rows of magnets.

A central space between the inner downwardly extending legs can support a yoke thereon. The yoke itself is a U-shaped structure with downwardly extending yoke legs. Inside lower portions of these yoke legs have the rows of magnets mounted thereto on either side of a gap between the magnets and within the yoke. The voice strip extends up through this gap.

The rows of magnets could conceivably be just two elongate bar magnets. Most preferably, a series of bar magnets are provided within each row, with north ends of one magnet adjacent to south ends of adjacent magnets of the same row. Orientation of the two rows of magnets relative to each other and relative to north and south are provided so that a magnetic field orientation is appropriate to cause the voice strip to move up and down when the electric signal within the conductive pathway of the voice strip interacts with the magnetic field, and with varying current magnitude resulting in varying force applied to the voice strip. The magnets are preferably rare earth permanent magnets. Because the voice strip and piston are affixed securely together, movement of the voice strip results in movement of the piston. The piston causes sound output to the emanate downwardly (or outwardly if the speaker is not mounted facing downwardly from a ceiling) from the linear speaker.

The housing of the overall assembly can have appropriate clips, slots and brackets thereon to facilitate attachment to adjacent T-bar structures (typically at ends thereof, but also along a length thereof) and to otherwise allow for integration into a T-bar grid of a suspended ceiling. While in a preferred embodiment a width of the housing is about one inch and similar with the other T-bars within the T-bar grid, in at least one embodiment, the housing has a greater width and adjacent ceiling tiles are slightly modified or are provided at a standard slightly narrower size to fill spaces in the T-bar grid adjacent to the linear loudspeaker.

An amplifier or other sound signal source, as well as power supply and connections can be mounted to upper portions of the housing, or can be otherwise suspended above the plane of the suspended ceiling and wired into the loudspeaker. The housing can otherwise further include elements therein, such as suspension holes which can interact with suspension wires so that the loudspeaker can be suspended in the same manner as portions of T-bars within a T-bar grid, and so that installation procedures for the loudspeaker can be similar to those utilized for placement of the T-bar grid.

According to one embodiment, the invention is a line source loudspeaker the diaphragm of which may have a width similar to the wavelength of the highest frequency of interest and of theoretically any length preserving a cylindrical wavefront without lobing, composed of any high specific modulus solid or composite material, such as Rohacell, a rigid, lightweight, plastic foam with mass, damping and stiffness optimizable; a front and rear suspension familiar to those skilled in the art the purpose of which is keep the front speaker radiation from connecting with the opposite negative radiation from the rear of the speaker and cancelling each other out, to allow movement of the diaphragm in only a single direction perpendicular to the surface of the diaphragm, without pitch, yaw, or camber changes, so as to approach as closely as is practical a perfect pistonic action, and the stiffness of said suspensions will set the low frequency resonance along with the system's total moving mass; a rigid central spine composed of Kapton, aluminum, Nomex or any of the materials used for voice coil formers familiar to those skilled in the art, attached to the back of the diaphragm perpendicular to the front radiating surface to carry the electrical conductor or conductors, which may be attached on the outside of a one piece spine or alternately inside a sandwich construction of two or more layers bonded to create a single mechanical structure, with current flow in the same direction if multiple conductors are used, which multiple conductors may be in parallel or series by exiting each individual conductor the distal end of the speaker and returning through a low loss conductor outside of the magnetic gap and returning to the proximal end, multiple times for each conductor used, such as the force created when the conductors are in a magnetic field, either overhung or underhung as is known by those skilled in the art, shall drive with equal force at any point of the diaphragm inducing equal pressure at any point along the length of the diaphragm with equal displacement, simultaneously, to create a cylindrical wavefront with accuracy in both the frequency and time domains; a magnetic structure the full length of the speaker using one or more magnets and a motor structure to contain the magnets utilizing a magnetic metal, or non-ferrous material, as is known by those skilled in the art, to create a magnetic gap into which the spine and attached conductors are located, with north and south poles located on opposing sides of the spine and conductors; and a frame to hold the above components which may be made of a magnetic ferrous material to become part of the magnetic motor structure as well as the frame for all the above speaker parts.

As an option, the speaker uses ferrofluid, a magnetic oil, in the magnetic gap for damping spurious resonances and heat sinking to increase power level consumption capability by four times steady state and ten times peak level for an overhung conductor, and six times steady state to twelve times peak level for an underhung conductor, where no part of the conductor is ever out of contact with the ferrofluid.

As an option, the speaker uses a specially formulated ferrofluid with a high Gauss and very low viscosity (Centipoise) where the fluid on each side of the spine is physically separated and will levitate the spine to the center of the magnetic gap eliminating the need for, and substituting the rear suspension entirely, as the fluid on each separate side will attempt to create a circular cross section instead of a vertically oriented rectangular cross section, applying pressure independently to each side of the spine across the entire length of the magnetic gap, forcing the blade to a state of equilibrium at the center of the gap, keeping the blade and conductor(s) from contacting the motor structure and scraping or distorting the audio signal.

As an option, the speaker can be sized to fit between standard 24" acoustic tiles, improving aesthetics, sound distribution performance and quality compared to round speakers, and ease of installation as no custom cutting of is required.

As an option, the speaker can be manufactured with very low resistance in order to operate on low voltage, high current audio amplifiers.

As an option, the speaker can be operated in series using ten or more units and a single standard audio amplifier with simplified cost and wiring, requiring no matching transformers and only a single return cable to the audio amplifier.

Rohacell is a trademark of Evonik Operations GmbH of Germany.

Kapton is a trademark of Dupont Electronics, Inc. of Wilmington, Delaware.

Nomex is a trademark of Dupont Safety & Constructions, Inc. of Wilmington, Delaware.

OBJECTS OF THE INVENTION

Accordingly, a primary object of the present invention is to provide a loudspeaker with a diaphragm that is significantly longer than it is narrow, such as with a ten to one or more aspect ratio.

Another object of the present invention is to provide a loudspeaker which accurately and efficiently emits low frequency long wavelength sound waves from the loudspeaker with a diaphragm which is narrow in at least one dimension, such as about one inch.

Another object of the present invention is to provide a loudspeaker which can fit between ceiling tiles and within a T-bar grid of a suspended ceiling and assist in holding ceiling tiles adjacent thereto, for providing sound within a space beneath the suspended ceiling.

Another object of the present invention is to provide a loudspeaker which provides efficient high quality sound from a speaker that is at least ten times longer than it is wide.

Another object of the present invention is to provide a loudspeaker which is of a rectangular shape.

Another object of the present invention is to provide a method for mounting a loudspeaker within a suspended ceiling with little or no modification of ceiling tiles within the suspended ceiling and adjacent to the loudspeaker.

Another object of the present invention is to provide a loudspeaker with an elongate diaphragm which is stiff enough and light enough to cause the diaphragm to move rapidly to generate sound waves and with minimized distortion of the sound.

Other further objects of the present invention will become apparent from a careful reading of the included drawing figures, the claims and detailed description of the invention.

DESCRIPTION OF THE PREFERRED EMBODIMENT

Figure 1:
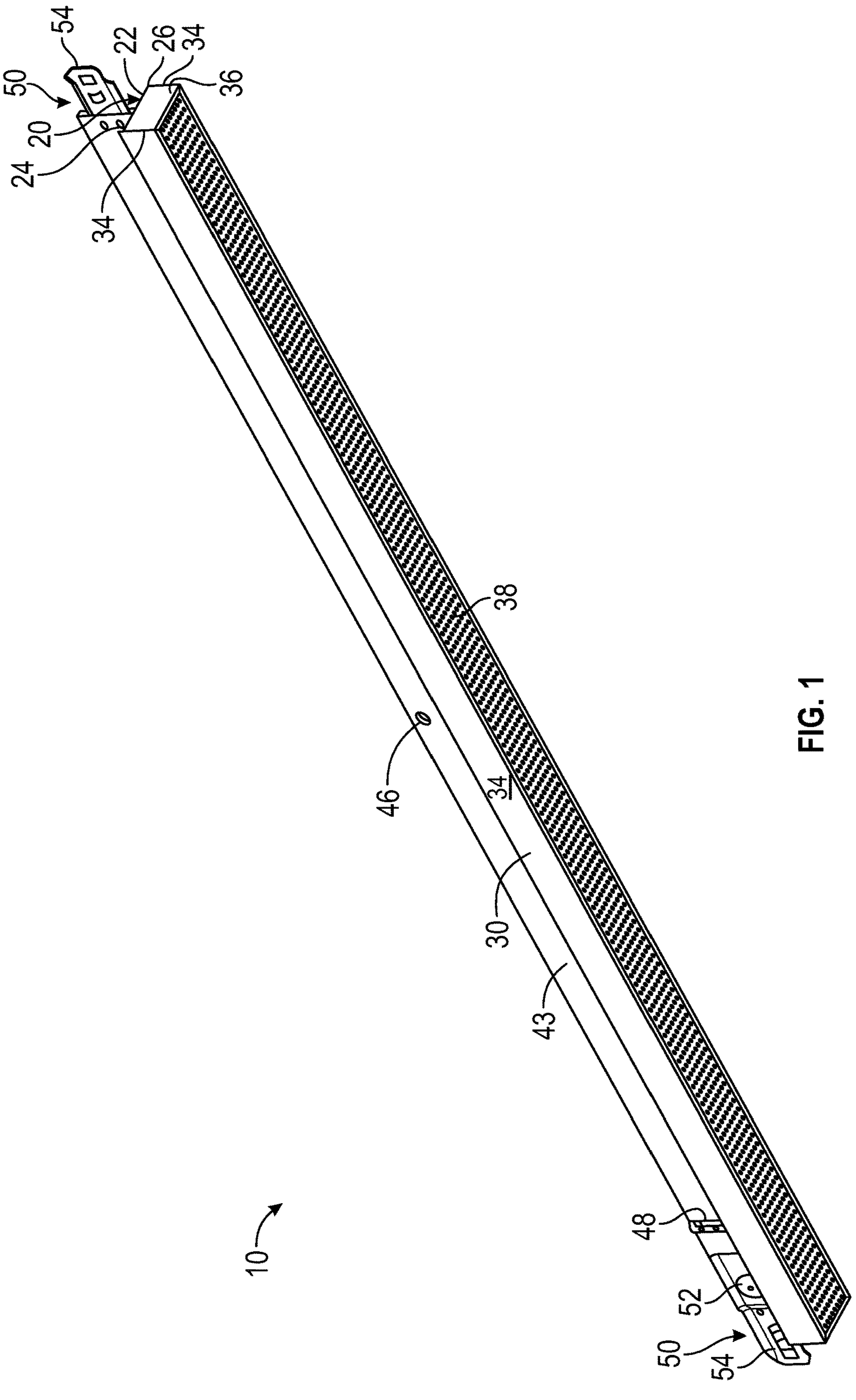
FIG. 1 is a perspective view of a prior art system generally in the form of a T-bar of a dropped ceiling which includes a compartment for mounting of at least one speaker of a sound system for integration into a dropped ceiling according to one prior art system.

Referring to the drawings, wherein like reference numerals represent like parts throughout the various drawing figures, reference numeral 310 (FIG. 8) is directed to a speaker assembly according to an example embodiment of this invention. The speaker assembly 310 has an elongate form at least then times longer than it is wide, and yet still has good low frequency response due to a lightweight and stiff diaphragm 384 and other speaker assembly details. The speaker assembly 310 in this example embodiment is particularly configured to be mounted within a T-bar grid structure of a suspended ceiling, with ceiling tiles C resting upon rest shelves 330 associated with the speaker assembly 310. The invention could alternatively be employed in other ways other than in a "suspended ceiling" in alternative embodiments.

Figure 8:
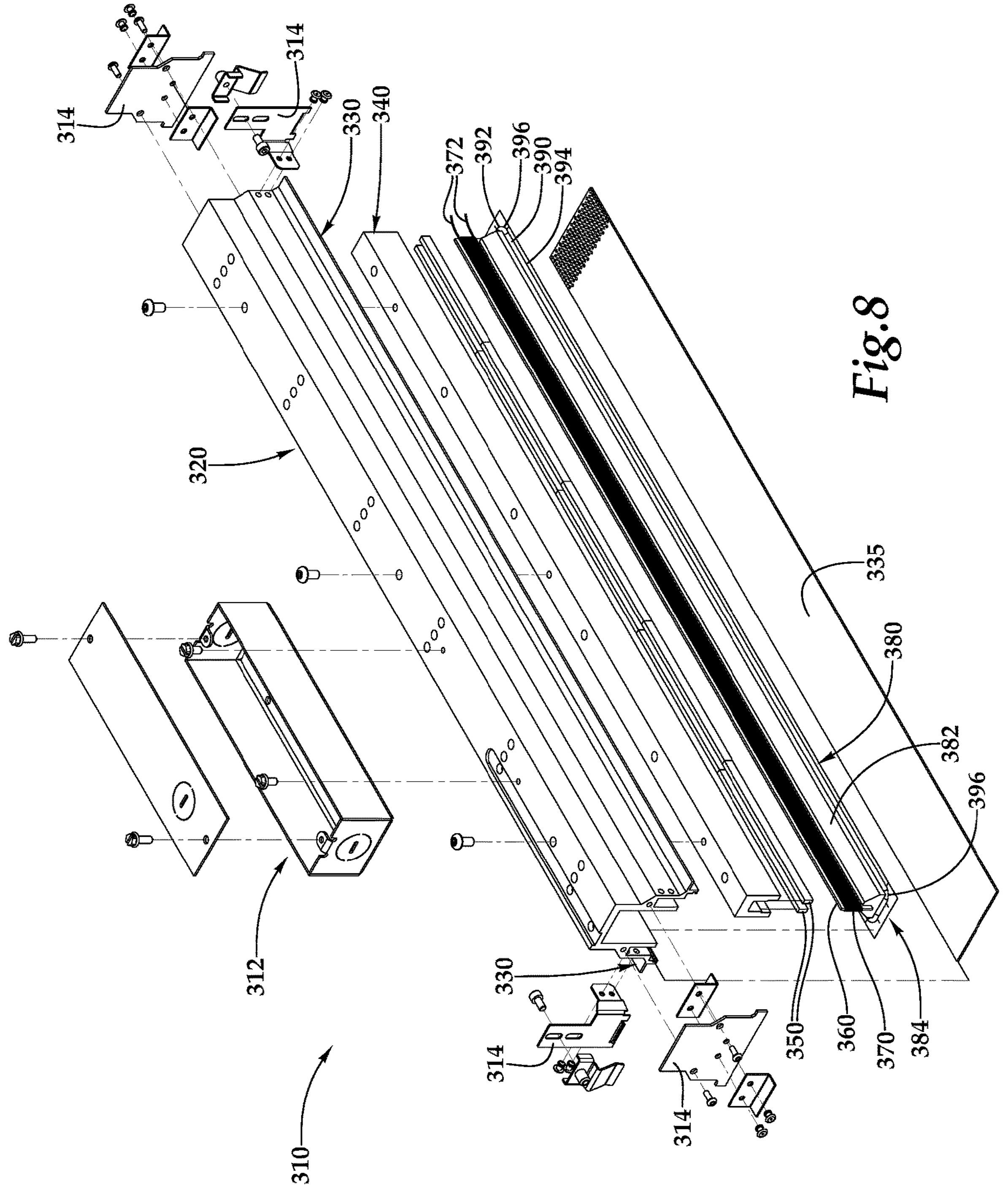
FIG. 8 is an exploded perspective view of a rigid linear diaphragm loudspeaker according to one embodiment of this invention disclosed herein.
Figures 9, 10, 11, 12:
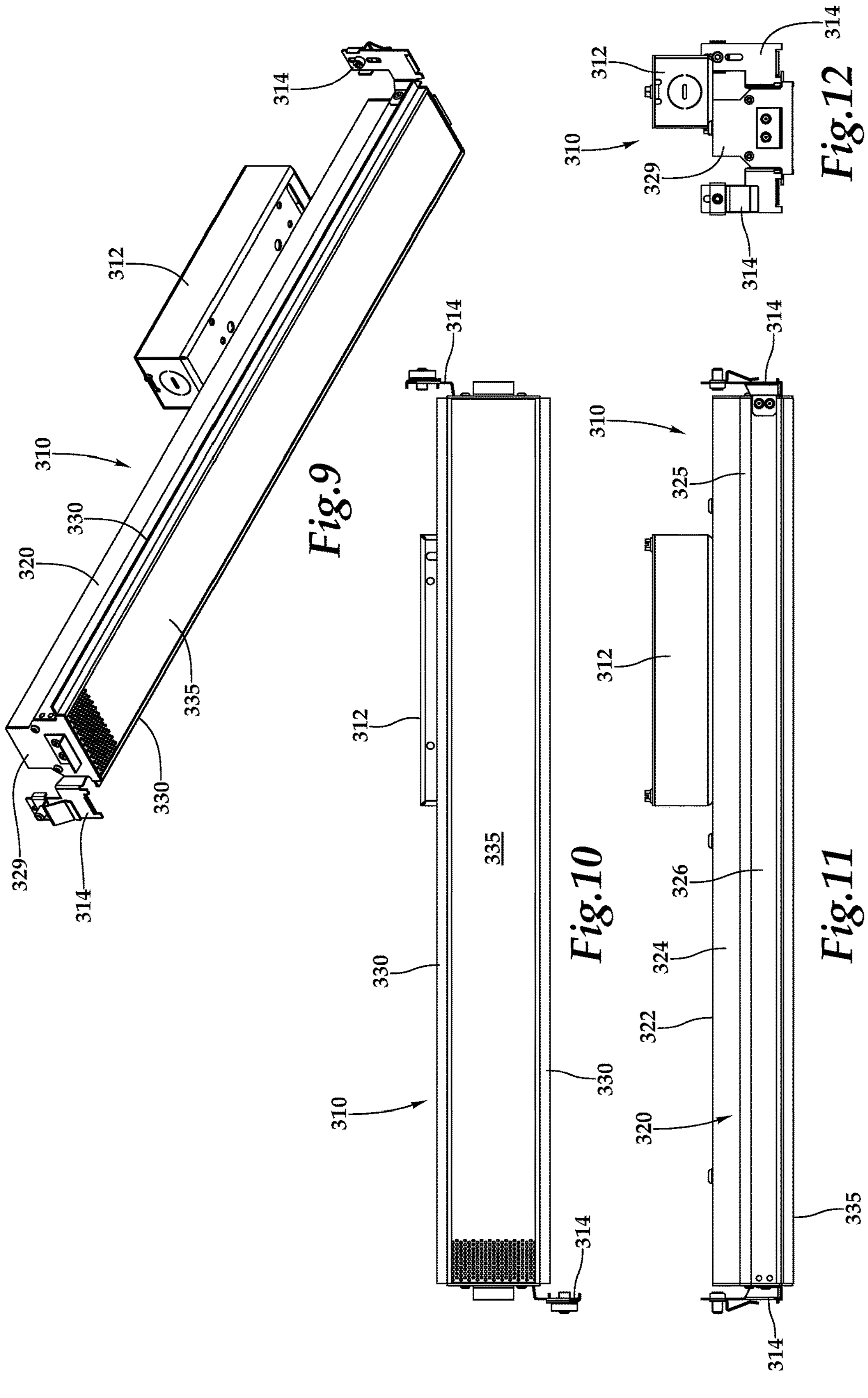
FIG. 9 is a perspective view from below of that which is shown in FIG. 8.
FIG. 10 is a bottom plan view of that which is shown in FIG. 8.
FIG. 11 is a front elevation view of that which is shown in FIG. 8.
FIG. 12 is an end elevation view of that which is shown in FIG. 8.
Figure 13:
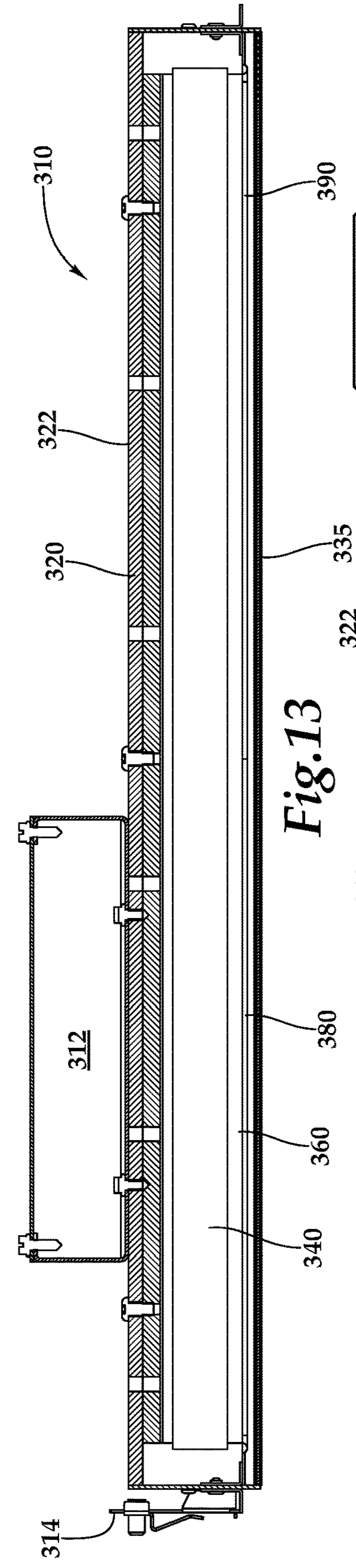
FIG. 13 is a full sectional front elevation view of that which is shown in FIG. 8.
Figure 14:
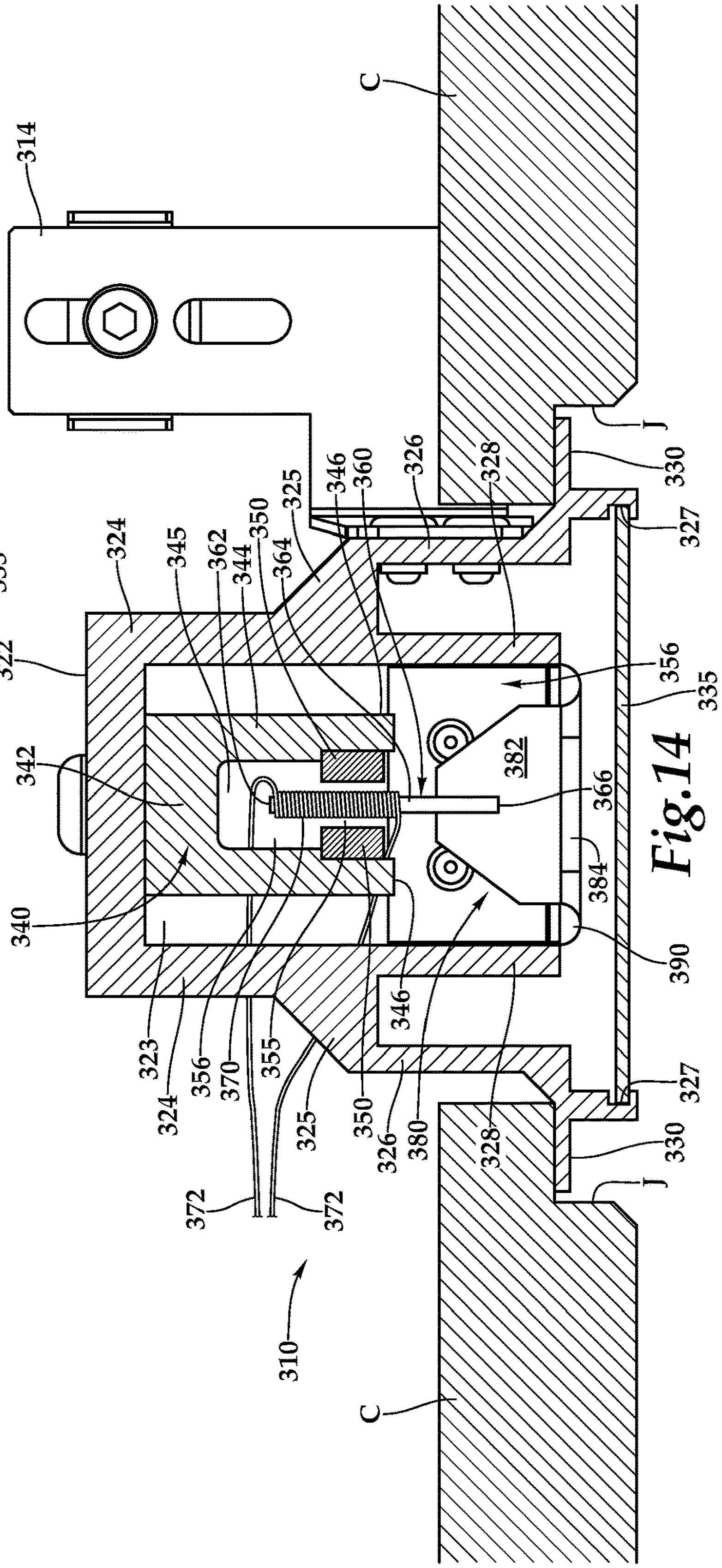
FIG. 14 is a full sectional end elevation view of that which is shown in FIG. 8, and with ceiling tiles resting upon rest shelves associated with the invention.

In essence, and with particular reference to FIGS. 8 and 14, basic details of the speaker assembly 310 are described according to an example embodiment depicted herein. This speaker assembly 310 extends between ends which include T-bar attachment hardware 314 thereon for attachment to adjacent T-bars. The speaker assembly 310 is carried within a frame 320 of rigid elongate form. Rest shelves 330 are supported on lower lateral portions of the frame 320 which rest shelves 330 are configured to support edges of ceiling tiles C adjacent thereto. A yoke 340 is supported within an interior of the frame 320. Magnets 350 are mounted to the yoke 340 with a gap 355 between the magnets 350.

A voice strip 360 is located within the gap 355 with the voice strip 360 including a voice coil 370 associated therewith and mounted to a piston 380. The voice strip 360 and associated voice coil 370 and piston 380 vibrate together, separate from the frame 320. The piston 380 is caused to move by the voice coil 370 interacting with the magnets 350, causing the voice strip 360 and attached piston 380 to vibrate, and emits sound from a diaphragm 384 mounted to the piston 380. A surround 390 supports the piston 380 laterally while still allowing it to vibrate and emit sound therefrom.

One prior art loudspeaker related somewhat to this invention is depicted in FIGS. 1-7 included herewith. This prior art loudspeaker 10 (and embodiments thereof in the form of loudspeakers 110, 120 and 310) are described as follows. A system 10 is provided for mounting a speaker S into a ceiling assembly 100, such as a suspended ceiling with ceiling tiles C located in spaces in a grid of T-bars or similar system 10 elements. The system 10 provides elongate elements which also function as T-bars within the ceiling assembly 100 and include a compartment 30 for supporting at least a portion of a speaker S therein, and preferably the entire speaker S contained within this compartment 30.

In essence, and with particular reference to FIGS. 1-5, basic details of the system are described, according to a preferred embodiment. The system 10 provides elements within a ceiling assembly 100 which can come in a smaller size system embodiment 10, or a longer embodiment 110 (FIG. 2) or a hybrid/half embodiment 120 (FIG. 3) where the shortened compartment 125 is shorter than the length of the overall T-bar like hybrid embodiment element 120. Each system 10 element includes an elongate planar shelf 20 extending between opposing ends. A spine 40 extends up from the shelf 20, so that the spine 40 and shelf 20 together have a T-bar like form. A compartment 30 is provided beneath the shelf 20. This compartment 30 is configured so that it can contain at least a portion of a speaker S therein, and most preferably contain the entire speaker S therein. The compartment 30 has an elongate form similar to that of the shelf 20 (except in the half embodiment 120 where the compartment 30 has a length approximately half that of the shelf 20). Connectors 50 are provided at opposite ends 44 of the spine 40 to facilitate interconnection of separate system 10, 110, 120 elements together to form the grid structure of a ceiling assembly 100 for supporting of ceiling tiles C in spaces therein.

Figure 5:
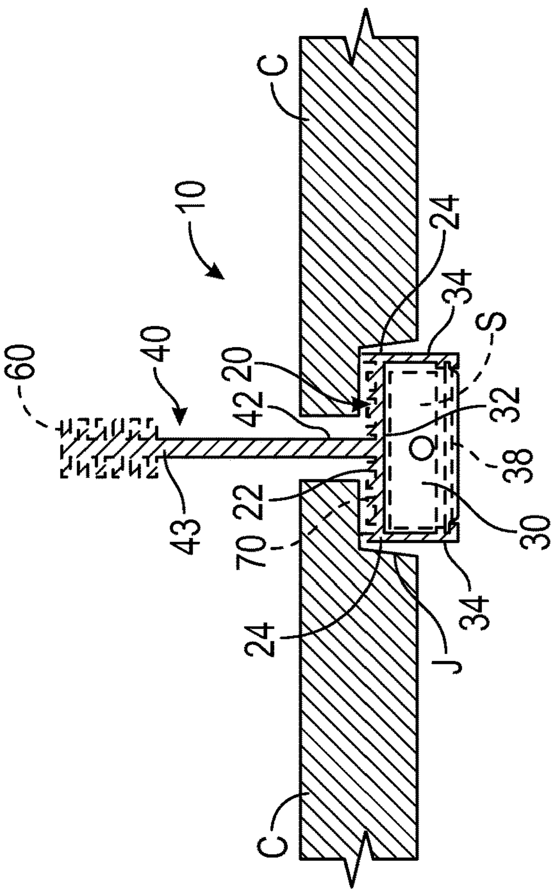
FIG. 5 is an end elevation full sectional view of that which is shown in FIGS. 1 and 2 and with ceiling tiles resting on the shelf thereof according to one prior art system.
Figure 4:
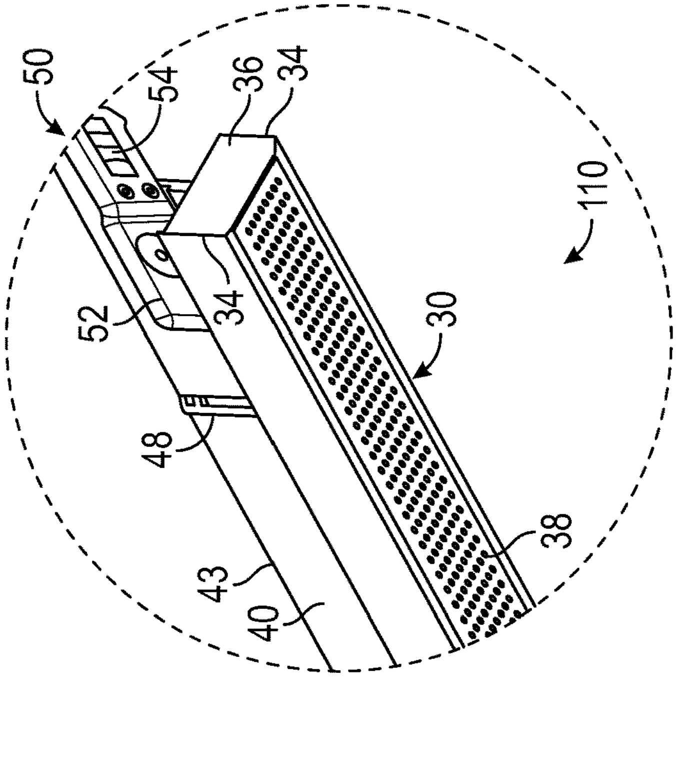
FIG. 4 is a perspective view of a detail of a portion of that which is shown in FIGS. 1 and 2, revealing details of a speaker compartment and connector.

More specifically, and with particular reference to FIGS. 4 and 5, details of the shelf 20 of the system 10 are described, according to a preferred embodiment. The shelf 20 is preferably formed as one part of an extrusion along with the spine 40 (and preferably also the compartment 30), with the shelf 20 and spine 40 formed from a common unitary mass of material, most typically aluminum. The shelf 20 could be formed of other materials besides aluminum and could be formed from other manufacturing processes either separate from the spine 40 or along with the spine 40. For instance, the shelf 20 could be formed of an injection molded or extruded plastic material or could be formed by bending of sheets of material such as a thin sheet of steel, bent to have the desired finished form of the shelf 20 alone or shelf 20 and spine 40 together.

Figure 6:
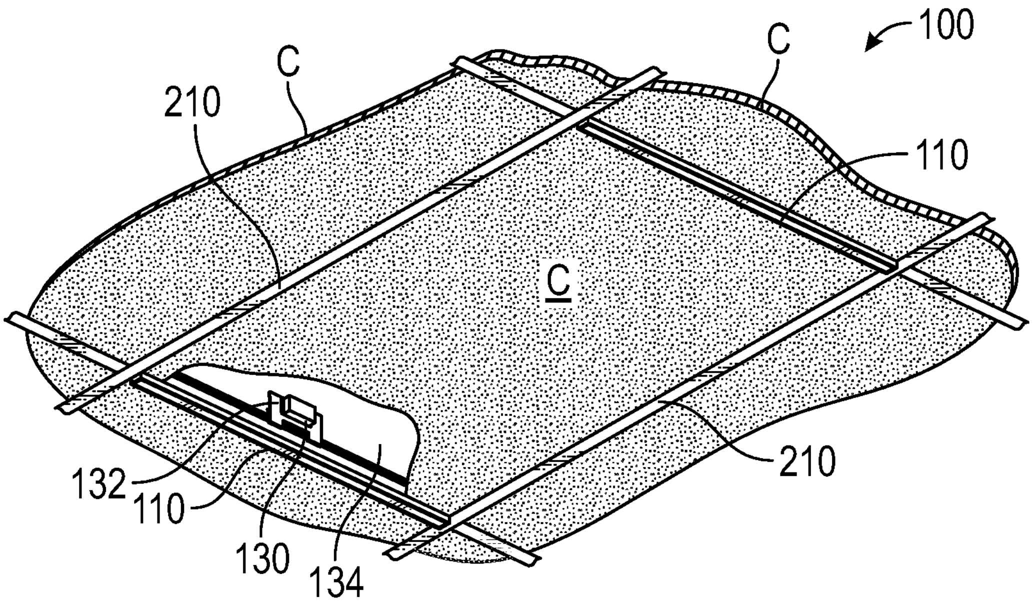
FIG. 6 is a perspective view from below of a dropped ceiling incorporating the prior art loudspeaker mounting system of FIG. 1, and with portions of a ceiling tile thereof cut away to reveal further details of the overall assembly.
Figure 7:
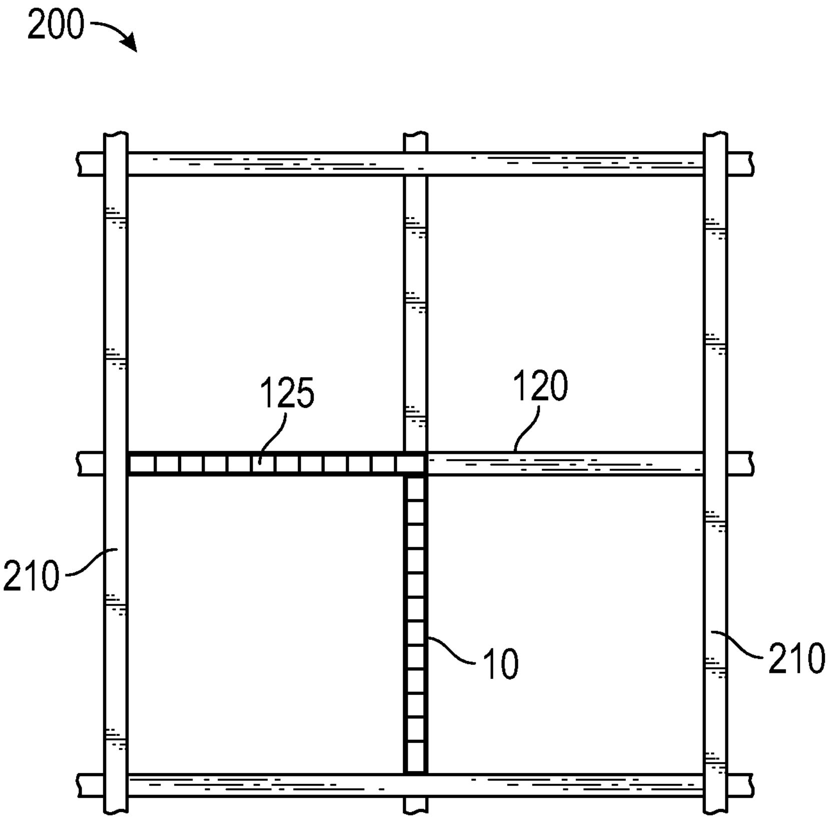
FIG. 7 is a bottom plan view of a further alternative T-bar grid utilizing long T-bars such as those shown in FIG. 2, short T-bars such as those shown in FIG. 1 and hybrid T-bars such as that shown in FIG. 3 together into a dropped ceiling in one implementation of a system and method of the prior art.

The shelf 20 preferably has a constant cross-sectional form which is substantially planar and horizontal when installed as part of a dropped ceiling assembly 100 (FIGS. 6 and 7). The shelf 20 includes a planar top surface 22 which is bounded by lateral edges 24 on either side of this top surface 22. Opposing ends 26 of the shelf 20 define an overall length for the shelf 20.

In the embodiment depicted in FIG. 1, the distance between these opposing ends 26 is approximately half of a length of the long embodiment 110. As a typical example, the distance between the opposing ends 26 could be two feet with the long embodiment 110 having a distance between opposing ends 26 being four feet. Other appropriate measurements might include sixty centimeters for the shorter embodiment (FIG. 1) and one hundred twenty centimeters for the long embodiment 110. With the half embodiment 120 (FIG. 3) the shelf 20 has a length and configuration similar to that of the long embodiment 110. However, the shortened compartment 125 is half size with a size similar to that of the compartment 30 provided with the short embodiment shelf 20 (FIG. 1).

The top surface 22 of the shelf 20 is preferably bisected by the spine 40 joining to the shelf 20 at a midpoint thereof. A width of the shelf 20 between the lateral edges 24 is such that when the spine 40 divides the top surface 22 into two portions each portion is still sufficiently large to securely hold an edge of a ceiling tile C resting thereon. In a simplest embodiment, the ceiling tiles C have rectangular edges which merely rest upon the top surface 22 of the shelf 20. In the embodiment particularly shown in FIG. 5 the edges of the ceiling tiles C are notched to provide a lap joint J at the edge of the ceiling tile C. This allows the ceiling tile C to rest with a lower surface of the ceiling tile C a little bit lower than it would otherwise rest, and help the compartment 30 to be hidden somewhat by the ceiling tiles C. This effect can be further increased by providing ceiling tiles C which are thicker or with an asymmetrical joint J that still has sufficient material to support the weight of the ceiling tile C by resting upon the shelf 20, but extend down to hide a greater portion or all of sides of the compartment 30.

Furthermore, and particularly with speakers S which dissipate power directly at the compartment 30, heat transfer fins can optionally be provided extending up from an upper surface of the shelf 20 to assist in dissipating heat generated within the compartment 30 by operation of the speakers S therein. Where such heat transfer fins are supplied, most preferably they extend parallel with each other and vertically a similar height, except that fins at extreme edges extending up from the lateral edges 24 of the top surface 22 of the shelf 20 are preferably slightly higher to facilitate air circulation to access gaps between all of the heat transfer fins and for maximum heat transfer effectiveness. It is worth noting that the heated air coming off of these heat transfer fins is not located within the space beneath the ceiling tiles, but rather is in a space above the ceiling tiles C. Thus, load on air conditioning within a space below the ceiling tiles C is not increased by heat generated by the speakers S, but rather this heat is effectively routed to the space above the ceiling tiles C and outside of the air conditioned space beneath the ceiling tiles C.

With particular reference to FIGS. 1-5, details of the compartment 30, 125 for containing the speakers S are described. The compartment 30 is located beneath the shelf 20. In a preferred embodiment the compartment 30 is formed as a common extrusion along with the shelf 20 and spine 40. Alternatively, the compartment 30 can merely be attached to the shelf 20, preferably in a permanent fashion, but alternatively with removable fasteners, such as screws or with other fasteners such as rivets, or through a welding procedure.

The compartment 30 can have any of a variety of different geometric configurations in various different widths in various embodiments of this invention. Most preferably, and as depicted in FIGS. 1-5, the compartment 30 has a constant cross-sectional form with a width similar to a width of the shelf 20 from which the compartment 30 extends downwardly. The compartment 30 has a width defined by side walls 34 which are preferably parallel and spaced from each other with the compartment 30 therebetween.

An upper surface 32 of the compartment 30 is defined by a lower portion of the shelf 20. End walls 36 are provided at ends of the compartment 30 defining an overall length of the compartment 30 and which are preferably adjacent to the opposing ends 26 of the shelf 20 (except with the half embodiment 120 (FIG. 3) where the end walls 36 include one end wall at a midpoint of the adjacent shelf 20).

A grille 38 preferably encloses the compartment 30 at least partially by spanning between lower tips of the side walls 34. This grille 38 could attach in a variety of different ways. In one embodiment the tips of the side walls 34 include a groove extending horizontally and inwardly. The grille 38 can snap into this groove to be held adjacent the tips of the side walls 34. The grille 38 can have any of a variety of different forms.

In one embodiment the grille 38 has a fabric-like form. In other embodiments the grille 38 is a sheet of metal or plastic or other material which is substantially rigid and includes a series of small holes therein. The grille 38 is preferably removably attachable to the side walls 34 to facilitate installation of speakers S into the compartment 30, and then with the grille 38 closing off the compartment 30 and tending to keep the speakers S clean and protected from damage.

With continuing reference to FIGS. 4 and 5, details of the spine 40 are described, according to this preferred embodiment. The spine 40 is preferably formed along with the shelf 20 as a common extrusion. As an alternative, the spine 40 could be formed separately and then joined to the shelf 20, such as through utilizing fasteners. The spine 40 is preferably formed of a material similar to that of the shelf 20 but could be formed of some different material if desired. The spine 40 preferably has a continuous form which is planar and elongate between opposite ends 44 defining an overall length of the spine 40 being similar to an overall length of the shelf 20.

The spine 40 includes a lower edge 42 which carries the shelf 20 thereto, and most preferably is formed as a unitary mass with the spine 40 joined to the shelf 20 at this lower edge 42 of the spine 40. An upper edge 43 is provided opposite the lower edge 42. This upper edge 43 can be fitted with further heat transfer fins if desired to further augment heat transfer away from speakers S within the compartment 30 (or such fins can be provided alone without the fins on the shelf 20).

Figure 2:
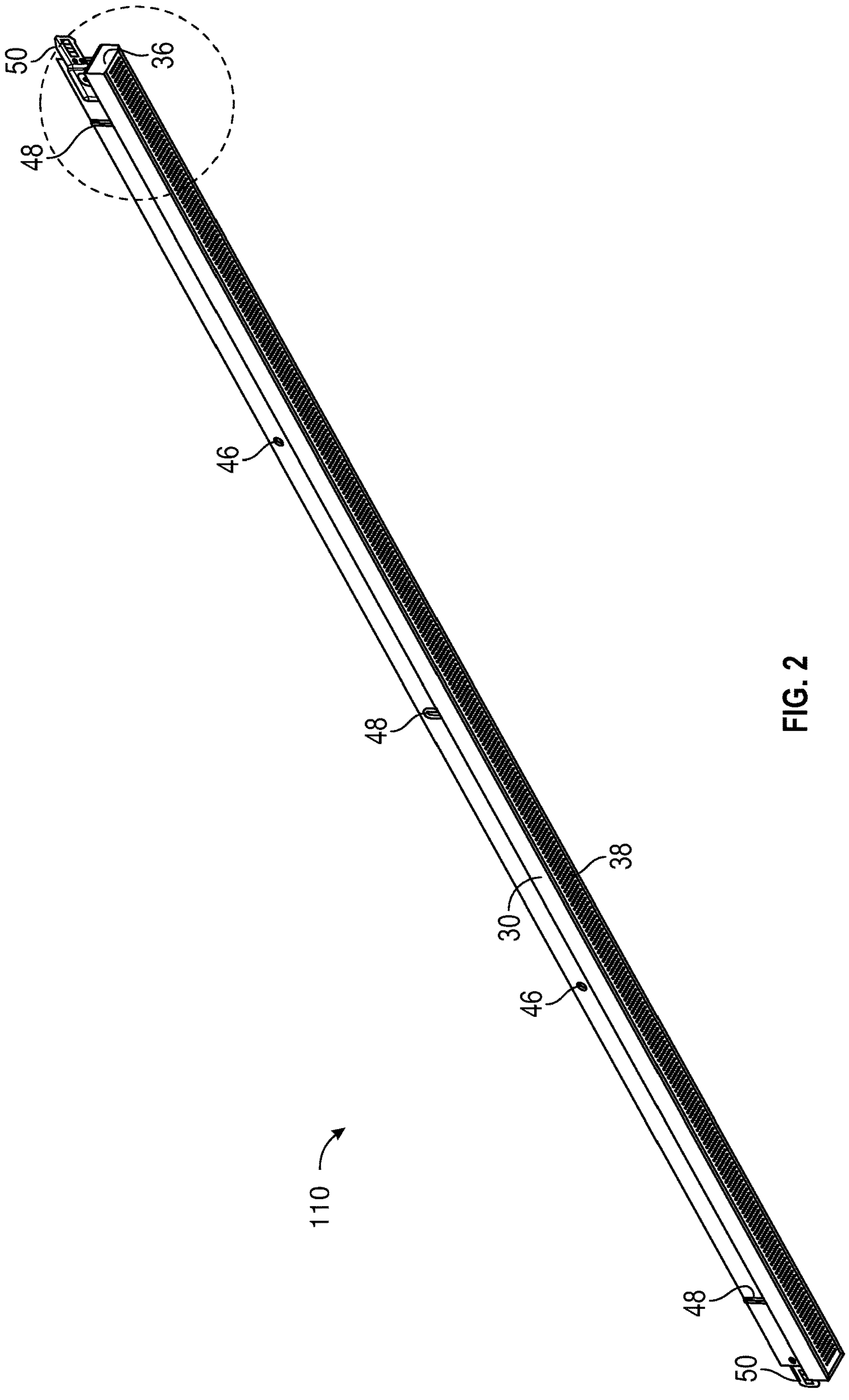
FIG. 2 is a perspective view of a variation on that which is shown in FIG. 1 with a longer form.
Figure 3:
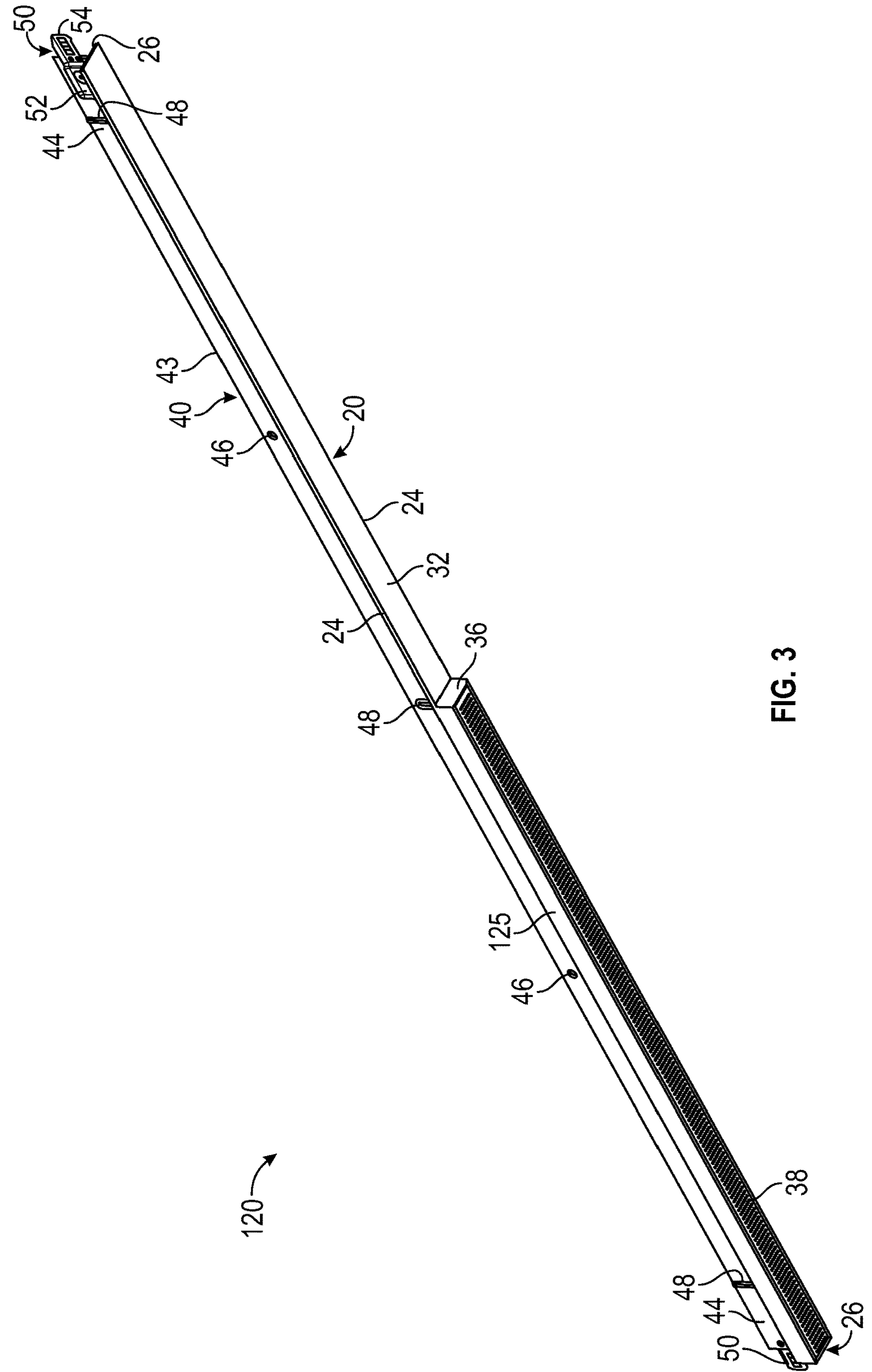
FIG. 3 is a perspective view of a further variation of that which is shown in FIGS. 1 and 2, with a long form for a shelf and spine of the T-bar shown therein but with a smaller size for a speaker containing compartment thereof.

The spine 40 also preferably includes suspension holes 46 periodically passing therethrough along with interconnection slots 48, with the interconnection slots 48 most preferably provided near each end 44 of the spine 40 and at a midpoint of the spine 40 (particularly for the long embodiment 110 of FIG. 2). The suspension holes 46 are typically utilized with wire routing therethrough and the wire anchored above the suspended ceiling area, so that the grid of T-bar like system 10 elements are suspended at a desired height above a space where the dropped ceiling is located. The suspension holes 46 provide that point at which this grid of system 10 elements are positioned.

The interconnect slots 48 preferably extend vertically and have a height similar to a height of the connectors 50 to join adjacent spines 40 together within a grid of the ceiling assembly 100. The connectors 50 are preferably in the form of generally rectangular rigid elements which have a base 52 opposite a tip 54. The base 52 is attached to one of the opposite ends 44 of the spine 40 and has the tip 54 extending horizontally away from the spine 40 past the end 44 to which the connector 50 is attached. This tip 54 can have a hook-like tooth extending downward from a tip thereof for more secure holding within an interconnect slot 48, or can have merely a rectangular form to allow it to slip into one of the interconnect slots 48. The connectors 50 thus hold ends 44 of one spine 40 within interconnect slots 48 of other spines 40.

Utilizing system 10 elements of either the short embodiment 10 (FIG. 1) or the long embodiment 110 (FIG. 2) or the half embodiment 120 (FIG. 3) can allow an overall ceiling assembly 100 along with ceiling tiles C to be formed, or an alternate ceiling assembly 200 (FIG. 7). In particular, a typical ceiling assembly 100, 200 includes long T-bar elements 210 which will often span between walls of a room or as far as a T-bar maximum length can conveniently be provided. These long T-bar elements 210 are typically spaced apart by a standard spacing distance such as every four feet. Long embodiment 110 system elements can then span perpendicularly between these longest T-bar elements 210. While it is conceivable that such longest T-bar elements 210 could have a compartment 30 therein for speakers S, most typically these longest T-bar elements are positioned where speakers S are not to be provided and merely provides structural support for the dropped ceiling assembly 100, 200.

Either plain four foot T-bar elements can span between the longest T-bar elements 210 or the long embodiment 110 system elements can span between these longest T-bar elements 210. Typically, such long embodiment 110 system elements or four foot long T-bars are placed every two feet between the longest T-bar elements 210. This results in spaces which are two feet by four feet which can have similarly sized ceiling tiles C placed therein. As an alternative, the short embodiment system 10 elements can be provided parallel to the longest T-bar elements 210 and spanning between the long embodiment 110 system elements or four foot plain T-bar elements spanning between the longest T-bar elements 210. Also plain two foot T-bars can similarly be provided in this parallel orientation between adjacent longest T-bar elements 210.

A resulting two foot by two foot space is provided for similarly sized ceiling tiles C to fit therein. In such an arrangement, it can be seen that there is a benefit to providing the half embodiment 110 system element which has a shortened compartment 125 on a portion thereof and with the remaining portion of the half embodiment 110 system element having a configuration similar to that of a plain T-bar with a shelf 20 and spine 40 but without any compartment 30. Accordingly, in such ceiling assemblies 100 and alternate ceiling assemblies 200 compartments 30 for speakers S can be provided at any location other than as part of the longest T-bar elements 210.

In other ceiling assemblies, and recognizing that each T-bar type element can be suspended independently from suspension holes 46 associated therewith, it is not required that longest T-bar elements 210 be provided, but rather an entire suspended ceiling can be provided from shorter T-bar type elements. It is conceivable that every shelf of every T-bar within a dropped ceiling could have a compartment 30 therein. Speakers S could then be provided everywhere within the suspended ceiling, rather than only in select locations. It is also conceivable that while the compartments 30 would be located everywhere, that the speakers S would be concentrated only in certain locations where sound is desired to be emitted. Thus, a ceiling of uniform appearance can be provided but with speakers S only at certain locations therein.

In a typical installation, speakers S would be provided within the compartments 30 entirely (as a potential alternative, the speakers could extend down from the compartment 30 somewhat so that the compartment 30 merely acts as containment for a portion of the speakers S and/or to provide mounting for the speakers S). The upper surface 32 and side walls 34 can be appropriately modified to facilitate mounting of speakers S therein. Such modification will typically involve at least one hole passing through the shelf 20 to allow for wiring and cabling to the speaker S within the compartment 30 to provide power and/or sound signal to the speaker S.

This cabling 134 can be routed all the way back to a centralized amplifier sound and power source. As an alternative, such amplification and sound source componetry can be distributed throughout the ceiling assembly 100, such as with power/signal supply modules 130 included on a bracket 132 which can mount to the upper edge 43 or otherwise to the spine 40 (FIG. 6) and with cabling 134 routed to such a power/signal supply 130, and then supplying power into the speakers S within the compartment 30 of each system 10 element. Such a power/signal supply 130 could be provided on each spine 40 for appropriately powering the speakers S within the compartment 30 associated with the spine 40, or only certain spines 40 of certain system 10 elements would be provided with such a power/signal supply 130 to supply power and signal to a region of speakers S within compartments 30 of adjacent system 10 elements.

A room having the suspended ceiling could have speakers S therein all powered with the same signal or different regions within the room could receive different sound signals. Differentiating the sound signals could include merely volume control but with the same sound signal or could include different sound signals so that sound appropriate for each region within the room can be provided.

With particular reference to FIGS. 8 and 14, specific details of the frame 320 of the speaker assembly 310 are described according to an example embodiment of this invention. The frame 320 is a rigid elongate structure typically having a length similar to the overall speaker assembly 310. This frame 320 could be formed from extruded aluminum in one example, but could be formed of other materials and manufactured in other ways. As an extrusion in this embodiment, the frame 320 has a substantially constant cross-sectional form.

A junction box 312 is mounted to an exterior of the frame 320 and can carry electronics for driving the loudspeaker components associated with the speaker assembly 310. T-bar attachment hardware 314 is attached to ends of the frame 320. These T-bar attachment hardware 314 items facilitate to the ends of the frame 320 being attached to T-bars within a suspended ceiling, typically while extending perpendicular to the T-bars from which they are attached (but optionally at an angle in certain ceiling configurations). This hardware and included clips and other hardware is for conveniently attaching the ends of the frame 320 to adjacent T-bars, so that the speaker assembly 310 can be placed into a suspended ceiling generally replacing a plain T-bar. If needed, ceiling tiles C (FIG. 14) adjacent to the speaker assembly 310 can be modified to have at least one reduced dimension if the speaker assembly 310 is wider than the T-bar it replaces.

The frame 320 includes a top plate 322 which is planar in form and typically wider than it is thick and longer than it is wide (with the length being at least about ten times greater than the width). The top plate 322 is not necessarily at an upper side of the frame 320, but is so located when the frame 320 is located within a suspended ceiling. The top plate 322 supports main legs 324 extending perpendicularly away from lateral edges of the top plate 320. These main legs 324 are typically as long as the entire frame 320. A channel 323 is generally defined as a space between the main legs 324 and the top plate 322. The channel 323 is generally open in a downward direction until it is filled with other components of the speaker assembly 310, described in detail below.

The main legs 324 each have transitions 325 for each of the main legs 324, transitioning as they extended downward into outer tips 326 and inner tips 328. The outer tips 326 and inner tips 328 are in this embodiment parallel with each other and narrower than the main legs 324. The outer tips 326 typically extend downward a slightly greater distance than the inner tips 328. Grill support grooves 327 face inwardly and are formed upon the outer tips 326. A grill 335 can thus be supported by the outer tip 326 of the frame 320, defining a lowermost portion of the overall speaker assembly 310. The inner tips 328 support portions of the sound generating portions of the speaker assembly 310, as described in detail below.

The outer tips 326 support rest shelves 330 extending laterally from lower portions of these outer tips 326 of the frame 320. These rest shelves 330 typically extend horizontally and within a common plane with each other, from each lateral side of the frame 320. Each rest shelf 330 is typically continuous in form and has a constant thickness extending out to tips which define an overall width of the speaker assembly 310. The rest shelves 330 act similarly to a rest shelf on a plain T-bar, as a place for an edge of a ceiling tile C to rest. In the particular embodiment depicted in FIG. 14, a notch J is provided at the edge of the ceiling tile C, and a size of this notch is similar to a width of the rest shelf 330, allowing the grill 335 to be generally in a common plane with lower surfaces of the ceiling C. In other configurations, this ceiling tile C could be un-notched and still rest upon the rest shelves 330. Rest shelves 330 are shown elevated slightly above the grill 335, but could be in a common plane with the grill 335 in an alternate embodiment.

A yoke 340 is provided within the channel 323 of the frame 320. As one option, the yoke 340 could be formed with the frame 320 as part of a common extrusion. In this embodiment, the yoke 340 is fastened to the top plate 322 of the frame 320 and resides within the channel 323, generally at a midpoint thereof and between the main legs 324 of the frame 320.

The yoke 340 is a rigid, inverted "U" shaped structure, with a junction 342 an upper portion thereof which is attached to the top plate 322 and a pair of arms 344 each extending down to ends 346. The arms 344 are on lateral sides of an inner space 345 beneath the junction 342. The pair of arms 344 extend vertically downwardly (for orientations such as that depicted in FIG. 14 where the speaker assembly 310 is mounted within a horizontal ceiling). The yoke 340 acts as a reference structure relative to which moving portions of the speaker assembly 310 can move for the generation of sound. The yoke 340 is typically about as long as the frame 320, but slightly shorter to allow for clearance between the yoke 340 and ends of the speaker assembly 310.

Magnets 350 are affixed to the arms 345 of the yoke 340, preferably near the ends 346. These magnets 350 could conceivably be a pair of elongate magnets which are as long as the frame 320. Typically, however, a series of separate bar magnets are oriented with north of one magnet adjacent to south of the next magnet, along inside portions of the ends 346 of the arms 344 of the yoke 340. Different orientations for the magnets 350 can be provided, depending on the orientation of an electrically conductive coil or other electronically conductive pathway associated with the voice strip 360, described in detail below. The magnets 350 are typically rare earth magnets. A gap 355 between the magnets 350 is preferably just large enough to avoid touching portions of the voice strip 360 and/or voice coil 370, to allow free movement of the voice strip 360 and voice coil 370 between the magnets 350.

While the magnets 350 are typically permanent magnets in this embodiment, it is conceivable the magnets 350 could be electromagnets, or could be permanent magnets of a type other than bar magnets. The orientations of the magnets could also be modified to function according to this invention.

Portions of the speaker assembly 310 which move relative to the frame 320, yoke 340 and magnets 350 include a voice strip 360 and associated voice coil 370 and associated piston 380. The voice strip 360 includes a spine 364 extending from an upper edge 362 to a lower edge 366. This voice strip 360 is preferably planar and has an elongate form with a height greater than a thickness. A centerline of the voice strip 360 extends vertically at a midpoint within the gap 355 and between the magnets 350. The upper edge 362 could be free or could be carried by a rear suspension structure which could attach to the junction 342 of the yoke 340. Such attachment would be by a highly flexible structure so that any such rear suspension would not significantly alter ability of the voice strip 360 to vibrate relative to the other portions of the speaker assembly 310. As another option, any such attachment could act to bias the voice strip 360 at a preferred neutral location when sound wave generating forces are not being applied, but allowing movement when such sound wave generating forces are applied.

The voice coil 370 in one embodiment is formed by wrapping a coil of wire around the spine 364 of the voice strip 360. In FIGS. 8 and 14 this voice coil 370 is depicted as wrapped around the spine 364 and about a vertical central axis for the voice coil 370. Alternatively, the voice coil 370 could be coiled about some other central axis, other than vertical, especially if the magnets 350 have an orientation which requires or benefits from such an alternate orientation for the voice coil 370. In one embodiment, the voice strip 360 itself is electrically conductive and forms at least part of a conductive pathway of the voice coil 370. Lead wires 372 extend from the voice coil 370 and are coupled to an audio sound file source, such as an audio amplifier speaker output.

The lower edge 366 of the voice strip 360 has the piston 380 mounted thereto. This piston 380 includes a body 382 on upper portions that are coupled to the lower edge 366 of the voice strip 360, and a lower portion defined by a diaphragm 384. It is the diaphragm 384 which interacts with air molecules adjacent thereto to import sound waves into surrounding air and for transmission to individuals to hear sound produced by the speaker assembly 310. This diaphragm 384 is formed of highly rigid and lightweight material, Rohacell in one embodiment. The diaphragm 384 has a shape which is typically generally rectangular with a width slightly less than the spacing between the main legs 324 of the frame 320 and a length similar to a length of the yoke 340 and slightly less than the length of the frame 320. This diaphragm 384 is supported on lateral edges by a surround 390 which joins the diaphragm 384 to the inner tips 328 of the frame 320. This surround 390 is formed of a highly elastic material which is also highly flexible so that it allows the diaphragm 384 and associated piston 380 to move freely along with the voice coil 370 and voice strip 360, relative to the magnets 350, yoke 340 and frame 320. The surround 390 includes ends 392 and sides 394 of elongate form, with the sides 394 joined to the ends 392 at corners 396, so that the surround 390 preferably entirely surrounds a perimeter of the diaphragm 384.

In one embodiment, a ferrofluid 356 is maintained above the surround 390 and within the gap 355 and within the inner space 245. This ferrofluid 356 can enhance loudspeaker performance for the speaker assembly 310 in at least some instances.

While, the speaker assembly 310 could have a variety of different lengths, typically its lengths are defined by spacing between T-bars in the suspended ceiling. Such lengths are often two feet or four feet long. Typically, a width of the speaker assembly 310 is about one inch for the diaphragm 384 of the piston 380, but closer to two inches for the grill 335 covering the speaker assembly 310 on a lower surface thereof. Thus, even if the speaker assembly 310 is only two feet long, it still has an at least 10 to 1 aspect ratio with a width of the speaker assembly 310 less than 1/10 (less than 10%) of a length of the speaker assembly 310. When the speaker assembly is spanning a four foot space between adjacent T-bars, the aspect ratio for the diaphragm 384 width versus its length would be closer to 1:48. By making the diaphragm 384 and associated piston 380, voice coil 370 and voice strip 360 elongate in form, and typically at least nearly two feet long, and often closer to four feet long, the diaphragm 384 can be similar in length to many low frequency sound waves to be produced by the diaphragm 384, improving sound quality and efficiency. While the diaphragm 384 is typically planar in form, it could be slightly concave down in form, either with ends of the diaphragm lower than mid-portions of the diaphragm, or lateral edges of the diaphragm 384 lower than mid-portions of the diaphragm 384, or both.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When embodiments are referred to as “exemplary” or “preferred” this term is meant to indicate one example of the invention, and does not exclude other possible embodiments. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A rigid linear diaphragm loudspeaker, comprising in combination:
- an elongate yoke having a plurality of magnets supported thereby, said magnets in two rows with a gap therebetween;
- a voice strip of elongate form having a conductive pathway extending along a majority of a length of said voice strip;
- said voice strip located within said gap and movable within said gap and perpendicular to a length of said gap;
- said conductive pathway coupled to an audio signal source;
- a sound wave producing piston fixed to said voice strip, said piston including a diaphragm formed of rigid material; and
- wherein edges of said piston are supported by a flexible surround, said flexible surround anchored at least indirectly to said yoke.

2. The loudspeaker of claim 1 wherein said plurality of magnets include at least two left bar magnets oriented end to end and at least two right bar magnets oriented end to end.

3. A rigid linear diaphragm loudspeaker, comprising in combination:
- an elongate yoke having a plurality of magnets supported thereby, said magnets in two rows with a gap therebetween;
- a voice strip of elongate form having a conductive pathway extending along a majority of a length of said voice strip;
- said voice strip located within said gap and movable within said gap and perpendicular to a length of said gap;
- said conductive pathway coupled to an audio signal source;
- a sound wave producing piston fixed to said voice strip, said piston including a diaphragm formed of rigid material;
- wherein said plurality of magnets include at least two left bar magnets oriented end to end and at least two right bar magnets oriented end to end; and
- wherein said at least two left bar magnets are oriented with a north end of a first magnet adjacent to a south end of a second magnet.

4. The loudspeaker of claim 3 wherein said gap has a constant width between said left bar magnets and said right bar magnets.

5. The loudspeaker of claim 1 wherein said conductive path includes said voice strip being formed of conductive material, with said conductive material making up at least a portion of said conductive path.

6. The loudspeaker of claim 1 wherein said conductive path includes at least one wire extending along a length of said voice strip.

7. The loudspeaker of claim 6 wherein said wire conductive path includes a coil of wire with a plurality of turns around a spine of said voice strip, said spine located within said gap.

8. The loudspeaker of claim 1 wherein a housing includes at least two laterally spaced legs with said surround coupled on outboard edges thereof to said at least two laterally spaced legs, and wherein said at least two laterally spaced legs are spaced apart by a distance greater than a width of said yoke, and with said yoke supported between said at least two laterally spaced legs of said housing.

9. The loudspeaker of claim 8 wherein said housing includes a pair of rest shelves outboard of said at least two laterally spaced legs, each said rest shelf positioned to support an edge of a ceiling tile when said at least two laterally space legs are oriented extending vertically downwardly with said housing adjacent to a ceiling of a building space.

10. The loudspeaker of claim 9 wherein a grill extends between lower portions of said rest shelves and underlying said at least two laterally spaced legs and underlying said yoke and said piston.

11. The loudspeaker of claim 10 wherein said housing includes two inner tips and two outer tips outboard of said inner tips, with two of said tips extending from each of said at least two laterally spaced legs, said yoke located inboard of said inner tips, said surround coupled to each of said inner tips at ends of said inner tips, said rest shelves coupled to said outer tips and extending outwardly in opposite directions from each other, from said outer tips.

12. The loudspeaker of claim 1 wherein said diaphragm is formed of Rohacell.

13. The loudspeaker of claim 1 wherein said voice strip includes a spine within said gap, said spine formed of Kapton.

* * * * *